United States Patent [19]

Elmer

[11] 3,984,366

[45] Oct. 5, 1976

[54] BONDING GLASS FIBERS TO RUBBER

[75] Inventor: Otto C. Elmer, Akron, Ohio

[73] Assignee: The General Tire & Rubber Company, Akron, Ohio

[22] Filed: Mar. 17, 1975

[21] Appl. No.: 559,110

Related U.S. Application Data

[62] Division of Ser. No. 417,859, Nov. 21, 1973, Pat. No. 3,896,253.

[52] U.S. Cl. .......................... 260/29.3; 156/110 A
[51] Int. Cl.² ........................................ C08L 61/06
[58] Field of Search ............... 260/29.3; 156/110 A; 428/382

[56] References Cited
UNITED STATES PATENTS

| | | | |
|---|---|---|---|
| 3,194,294 | 7/1965 | van Gils | 156/110 A |
| 3,437,122 | 4/1969 | van Gils | 156/110 A |
| 3,778,406 | 12/1973 | Klötzer et al. | 156/110 A |

FOREIGN PATENTS OR APPLICATIONS 1,166,845  10/1969  United Kingdom ......... 260/29.4 UA

*Primary Examiner*—J. Ziegler

[57] ABSTRACT

An aqueous alkaline dispersion of a rubbery vinyl pyridine copolymer, a stabilized colloidal silica sol, and a heat reactable resorcinol-formaldehyde resole, in certain amounts, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined or laminated (calendered) with a curable rubber compound and the resulting assembly is cured to form a composite in which the glass fiber cord is bonded to the rubber by means of said adhesive.

6 Claims, No Drawings

BONDING GLASS FIBERS TO RUBBER

This application is a division of prior copending U.S. patent application Ser. No. 417,859, filed Nov. 21, 1973, now U.S. Pat. No. 3,896,253, granted July 22, 1975.

OBJECTS

An object of the invention is to provide a composite of a glass fiber reinforcing element adhesively bonded to a rubber compound, e.g., glass fiber tire cords adhesively bonded to provide carcass plies and belt plies for making tires. Another object is to provide glass fiber reinforcing elements, e.g., such as those used in the belt and the carcass plies of tires, with a minor amount of an adhesive so that the adhesive containing elements may subsequently be bonded to rubber on curing. A further object is to provide a method for bonding glass fibers, particularly glass fiber textiles, fibers, cords and so forth, to rubber compounds using a single dip. A still further object is to provide a glass fiber or cord adhesive dip composition. These and other objects and advantages of the present invention will become more apparent to those skilled in the art from the following detailed description and working examples.

SUMMARY OF THE INVENTION

According to the present invention it has been discovered that a composition comprising an aqueous alkaline dispersion of 100 parts by weight (dry) of a rubbery vinyl pyridine copolymer, from about 0.5 to 20 parts by weight of silica as a stabilized colloidal silica sol, from about 10 to 75 parts by weight of a heat reactable water soluble resorcinol-formaldehyde resole, from about 0 to 3 parts by weight of an alkaline material selected from the group consisting of $NH_4OH$, KOH and NaOH, and from about 150 to 1100 parts by weight of water, is very useful as a treating, dipping or coating material for use in bonding glass fiber reinforcing elements to rubber compounds. Sufficient alkaline material such as aqueous $NH_4OH$, KOH or NaOH is added to the dispersion (or to one or more of the ingredients of the dispersion before mixing them together) to obtain the desired pH, prevent coagulation of the latex and to provide for stabilization. This will vary with the pH of the sol, resole, the latex and so forth, all of which may vary from batch to batch. Since the amount of each compound may vary, the amount of alkaline material required can also vary. After drying the adhesive on the glass fiber reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties.

The present method involves only one dipping step and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results can be accomplished in one dip. Pre or post dips of other adhesive compositions are unnecessary when using the present aqueous adhesive dip.

Another advantage in employing the glass fiber cord dip of the present invention is that the components of the dip do not need generally to be pre-reacted. Many of the dips are stable at high solids concentrations for extended periods of time. The dried and/or cured adhesive coated cord can exhibit high humid aged tensile strengths, and the dried and/or cured adhesive coated cord can be coated uniformly without blister, in other words, it is smooth.

DISCUSSION OF DETAILS AND PREFERRED EMBODIMENTS

The glass fiber reinforcing element or cord comprises a plurality of substantially continuous and parallel glass fibers or monofilaments. The reinforcing element or fibers contain little or no twist. In other words, twist is not intentionally applied to the element or fibers; the only twist, if any, in the element or fibers is that occassioned on passing through the glass fiber processing apparatus and on packaging or winding up the cord to form a bobbin or spool. However, in a continuous process, the elements can proceed directly from the glass processing apparatus, can be dipped in the aqueous adhesive cord dip, dried, and given a twist of about 1.5 turns per inch thereafter. The elements then are woven into tire fabric having about one quite small pick thread or element, nylon or polyester, which may be a monofilament, per inch and calendered with a rubber ply or skim stock. The glass fiber reinforced ply stock is then ready to be used in the manufacture of a tire or for other purposes.

Glass compositions useful in making the fibers for the reinforcing element or glass tire cord are well known to the art. One of the preferred glasses to use is a glass known as E glass and described in "Mechanics of Pneumatic Tires," Clark, National Bureau of Standards Monograph 122, U.S. Dept. of Commerce, issued Nov., 1971, pages 241–243, 290, and 291. The number of glass filaments or fibers employed in the glass fiber reinforcing element or cord can vary considerably depending on the ultimate use or service requirements. Likewise, the number of strands of glass fibers used to make a glass fiber reinforcing element or cord can vary widely. In general, the number of filaments in the glass fiber reinforcing element or cord for a passenger car tire can vary from about 500 to 3,000 and the number of strands in the reinforcing element can vary from 1 to 10, preferably the number of strands is from 1 to 7 and the total number of filaments about 2000. A representative industry tire cord known as G-75 (or G-75, 5/0) has 5 strands each with 408 glass filaments. Another representative cord known as G-15 has a single strand containing 2040 glass filaments. In this connection reference is made to Wolf, "Rubber Journal," February, 1971, pages 26 and 27 and U.S. Pat. No. 3,433,689.

Shortly after the glass fibers are formed they are usually sized (by spraying or dipping and so forth and air drying) with a very small amount or fractional amount by weight of a material which acts as a protective coating during processing and handling of the glass fibers in forming the strands or reinforcing elements and during packaging. During the subsequent dipping in the aqueous adhesive tire cord dip, it is believed that the size is not removed. Materials for use as sizes for glass fibers are well known to the art. It is preferred to use a silane as a size, especially a silane which has groups which can bond or coordinate chemically or physically with at least parts of the surface of the glass of the glass fiber and with at least one or more of the components of the glass fiber aqueous adhesive cord dip. A very useful size to employ on the glass fibers is gamma-aminopropyl triethoxy silane, or similar aminoalkyl alkoxy silanes, which, when applied to the glass fibers, hydrolyzes and polymerizes to form a poly(aminosiloxane) in which a portion of the polymer is attached to the glass and another portion contains amine groups (having active hydrogen atoms) for reaction with components of the cord dip such as the RF resole or the vinyl pyridine copolymer compound. Various glass fiber sizing compounds and compositions are shown in U.S. Pat. Nos. 3,252,278; 3,287,204; and 3,538,974.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl-2-vinyl pyridine.

In practicing this invention, it is usually preferred to use a latex of a copolymer of from about 60 to 80% by weight butadiene-1,3, about 7 to 32% styrene and about 5 to 22% of 2-vinyl pyridine. Excellent results are obtained using a latex of a terpolymer of about 70% by weight of butadiene-1,3, 15% styrene and 15% 2-vinyl pyridine having a total solids content of around 30 to 50% by weight. Also, blends of latices may be used such as a blend of a butadiene-1,3/2-vinyl pyridine rubbery copolymer latex and a butadiene-1,3/styrene rubbery copolymer latex or a blend of a butadiene-1,3/styrene/2-vinyl pyridine rubbery copolymer latex and a butadiene-1,3/styrene rubbery copolymer latex so long as the percent by weight ratio of total monomers in the copolymers is within the ranges as specified above. The pH of the latices should be similar and the surfactants and stabilizers including freeze stabilizers should be compatible to avoid coagulation on blending or mixing of the latices. The polymers from these latices have Mooney viscosities ML-4 min. at 212°F. of from about 40 to 120. Further disclosures of rubbery vinyl pyridine copolymer latices may be found in U.S. Pat. Nos. 2,615,826 and 3,437,122.

Aqueous stabilized colloidal silica sols are well known and can be made by several methods. In one method a solution of sodium silicate is neutralized followed by dialysis through a semi-permeable membrane. In another method sodium silicate solutions are electrolyzed (electrodialysis) in an anode compartment separated from the cathode by a permeable diaphragm. In still another method silica sols can be prepared by dissolution of elemental silicon in an aqueous solution of ammonia or an amine. Silica sols can also be obtained by careful neutralization of sodium silicate. They can also be prepared by peptizing silica gels at elevated temperatures and by the use of ion exchange resins to remove sodium from sodium silicate solutions. These silica sols are stabilized against gelling by the addition of small amounts of alkali or ammonia or ammonium salts or an amphoteric metal and the like as Li, Na, K, and Al ions, ammonium and substituted ammonium ions, or mixture thereof (as a counter ion), expressed as $Na_2O$, $NH_4OH$, $Al_2O_3$ and so forth, so that the silica particles bear a small charge and tend to repulse each other. Preferably, these sols have an alkaline pH or are made alkaline prior to addition to the latex to prevent coagulation or additional alkaline material is added to the latex.

These aqueous stabilized colloidal silica sols can contain from about 1 to 50% by weight of silica (dry $SiO_2$). The ultimate particle size of the particles of $SiO_2$ in the aqueous colloidal sol is meant the average diameter of the particle present as measured with an electron microscope when the solution is diluted to about 0.1% $SiO_2$ or less with water and dried in a very thin layer deposit and can range from about 1 to 150 millimicrons, preferably from about 5 to 30 millimicrons.

Methods for the preparation, stabilization and characterization of these aqueous silica sols are disclosed in "The Colloid Chemistry of Silica And Silicates," Iler, Cornell University Press, Ithaca, N.Y., 1955, particularly pages 87 to 126, and in U.S. Pat. Nos. 2,597,872; 2,760,941 and 2,892,797.

The aqueous stabilized colloidal silica sols are used in the cord dips of the present in an amount sufficient to provide from about 0.5 to 20 parts by weight (dry), preferably from about 1.5 to 15 parts by weight (dry), of silica ($SiO_2$) per 100 parts by weight (dry) of the rubbery vinyl pyridine copolymer.

The heat reactable resorcinol-formaldehyde resole is made by reacting an excess of formaldehyde (or formaldehyde donor) with resorcinol or similar phenolic compound in aqueous media using sodium hydroxide and the like as a catalyst to form water soluble resoles containing hydroxyl and methylol groups. Such resoles are well known and cure by the application of heat. See "The Chemistry of Phenolic Resins," Martin, John Wiley & Sons, Inc., New York, 1956. The ratio dry of the vinyl pyridine copolymer to the resole is from about 100:10 to 100:75 parts by weight, preferably from about 100:10 to 100:55 parts by weight.

Water is used in an amount sufficient to provide for the desired dispersion of the rubber or latex particles, for the proper dispersion of the silica sol particles and for the solution of the resorcinol-formaldehyde resole, to obtain the desired viscosities, and for the proper solids content to get the necessary pickup of solids on and penetration between the fibers of the cord.

Based on 100 parts by weight (dry weight) of the vinyl pyridine rubber copolymer, or blend of the same, the dip comprises the rubber, from about 0.5 to 20 parts by weight of silica as the stabilized colloidal silica sol, from about 10 to 75 parts by weight of the water soluble resorcinol-formaldehyde resole, from about 0 to 3.0 parts by weight of water soluble base such as $NH_4OH$, KOH or NaOH to provide a pH of at least 7.0, and from about 150 to 1100 parts by weight of water.

In order to provide data for the tire cord adhesive of this invention, a standard single-cord H-pull test is employed to determine the static adhesion at room temperature and above of the adhesive-coated glass tire cord to rubber. All the data submitted herein including the working examples which follow are based upon identical test conditions, and all test specimens are prepared and tested in the same way generally in accordance with ASTM Designation: D 2138-67.

To apply the latex adhesive to the glass fiber cords in a reliable manner, the cords are fed through the adhesive dip bath while being maintained under a small predetermined tension and into a drying oven where they are dried under a small predetermined tension (to prevent sagging without any appreciable stretching). As the cords leave the oven they enter a cooling zone where they are air cooled before the tension is released. In each case the adhesive-coated cords leaving the dip are dried in the oven at from about 200° to 550°F. for from about 5–300 seconds, preferably at from about 400° to 500°F. for from about 90 to 30 seconds. The time the cord remains in the one-step adhesive is about a few seconds or so or at least for a period of time sufficient to allow wetting of the cord and at least substantial total impregnation of the fibers of the cord. The drying or curing of the adhesive treated glass fiber cord may be accomplished in one or more ovens at different times and temperatures.

The single-cord H-pull test is then employed to determine the static adhesion of the dried adhesive coated glass fiber cords to rubber. In each case the rubber test specimens are made from the same standard type vulcanizable rubber composition comprising rubber, reinforcing carbon black and the customary compounding and curing ingredients.

In every case the cords to be tested are placed in parallel positions in a multiple-strand mold of the type described in the single-cord H-pull adhesion test ASTM designated D 2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅜ inch cord embedment.

After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

Cords or fabric coated with the adhesive of the present invention using the one-step or single dip of this invention can have from about 10 to 40% by weight (dry) solids of the adhesive dip on the cord based on the weight of the cord and can be used in the manufacture of carcasses, belts, flippers and chafers of radial, bias, or belted-bias passenger tires, truck tires, motorcycle and bicycle tires, off-the-road tires and airplane tires, and, also, in making transmission belts, V-belts, conveyor belts, hose, gaskets, rubbers, tarpaulins and the like.

While the adhesive containing glass fiber reinforcing element can be adhered to a vulcanizable blend of natural rubber, rubbery cis-polybutadiene and rubbery butadiene-styrene copolymer by curing the same in combination together, it is apparent that the heat cured adhesive containing glass fiber reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, polybutadienes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, accelerators, antioxidants and other curatives, rubber compounding ingredients and the like well known to those skilled in the art for the particular rubbers being employed.

The following examples will serve to illustrate the invention with more particularity to those skilled in the art. In these examples the parts are parts by weight unless otherwise indicated.

EXAMPLE I

Resorcinol was dissolved in deionized water and aqueous NaOH. To this solution was added a formaldehyde solution with stirring. The resulting R-F resole resin solution was then added slowly to the vinyl pyridine copolymer latex with continuous stirring. Next the required amount of stabilized aqueous alkaline colloidal silica sol was added to the resorcinol-formaldehyde latex. As a comparison, precipitated hydrated finely divided silica was used, but it could not be added to the RFL without causing agglomeration and a product that was not suitable for cord dipping. However, the precipitated silica could be added to the stirred resin solution to disperse and wet the precipitated silica. This RF-silica mixture could then be added to the latex to form a smooth dip. The dips solids contents were about 40%. Glass fiber cords (1) were passed through the dips and then into an 8 foot long tube in which hot air was blown in a direction opposite to the movement of the cords. The temperature where the air entered the tube was 60° to 90°F. higher than the temperature at the exit end of the tube. The highest temperature during the drying or curing of the dipped cords was about 460°F., and the time in the tube was about 45 seconds. After said drying and curing, the adhesive treated cord was laminated with standard type rubber stocks A or B, and molded, and the resulting assembly was cured for 20 minutes at 305°F. After curing, the assembly was removed from the mold, cooled and tested according to the H-adhesion test described supra. The composition of the dips, the H-adhesions, cord tensiles and the physical properties of the dips are shown in the Tables below:

Table I

| | PROPERTIES OF RFL DIPS CONTAINING SILICAS | | | | |
|---|---|---|---|---|---|
| | Parts by Weight | | | | |
| Run No. | 1 | 2 | 3 | 4 | 5 |
| Components | | | | | |
| Resorcinol (.092 mol) | 10.1 | 10.1 | 10.1 | 10.1 | 10.1 |
| Water (deionized) | 13.3 | 13.3 | 13.3 | 13.3 | 13.3 |
| NaOH 1N (Aqueous, 4% solids) | 2.0 | 2.0 | 2.0 | 2.0 | 2.0 |
| Formaldehyde (37% by wt. $H_2CO$ in $H_2O$) (0.148 mol) | 12.0 | 12.0 | 12.0 | 12.0 | 12.0 |
| Collodial Silica (2) sol | — | 19.0 | 38.0 | — | — |
| Precipitated Silica (3) | — | — | — | 5.7 | 11.4 |
| Water (deionized) | — | — | — | 13.3 | 26.6 |
| Rubbery Vinyl Pyridine Copolymer Latex (41% total solids) (4) | 244.0 | 244.0 | 244.0 | 244.0 | 244.0 |

Table I-continued

PROPERTIES OF RFL DIPS CONTAINING SILICAS

| Run No. | Parts by Weight | | | | |
|---|---|---|---|---|---|
| | 1 | 2 | 3 | 4 | 5 |
| pH of dips | 8.9 | 8.9 | 9.9 | 8.75 | 8.6 |
| Surface tension (dy/cm$^2$) of dips | 46 | 45.5 | 46.6 | 50.1 | 51.2 |

| Storage Time (days) of Dips | Brookfield Viscosity in cps of Dips | | | | |
|---|---|---|---|---|---|
| 0 | 15.5 | 13.0 | 12.0 | 18.0 | 18.8 |
| 1 | 23.5 | 17.5 | 15.0 | 25.0 | 25.0 |
| 6 | 30.0 | 22.0 | 17.0 | 38.5 | 29.0 |
| 10 | 47.0 | 22.5 | 18.5 | 50.0 | 37.0 |
| 17 | 55.0 | 25.0 | 20.0 | 64.0 | 48.0 |
| 27 | 69.0 | 28.0 | 23.0 | 55.5 | 51.5 |
| Total solids of dips, % by wt. | 40.7 | 40.1 | 39.5 | 40.0 | 39.4 |
| Total H$_2$O of dips, parts by wt. | 166.8 | 180 | 193.3 | 180.1 | 193.4 |

Table II

PROPERTIES OF THE DIPPED TIRE CORDS

| Run No. | DPU (5) | H-Adhesion (lbs) | | | | Cord Tensile (lbs) (7) | |
|---|---|---|---|---|---|---|---|
| | | Stock A | | Stock B | | | |
| | | RT (6) | 250°F. | RT | 250°F. | Orig. | After Humid Aged (8) |
| 1 | 32 | 32.4 | 19.2 | 44.5 | 27.3 | 63.6 | 45.1 |
| 2 | 30 | 27.1 | 16.8 | 42.9 | 22.3 | 61.1 | 57.7 |
| 3 | 31 | 27.2 | 18.0 | 34.2 | 18.0 | 65.9 | 58.8 |
| 4 | 30 | 28.3 | 17.8 | 35.8 | 22.9 | 57.0 | 50.1 |
| 5 | 28 | 27.1 | 16.2 | 34.1 | 19.3 | 63.9 | 56.7 |

Notes:
(1) G-15 cord, E glass, single strand tire cord of 2040 glass filaments, Owens-Corning Fiberglas Corporation.
(2) Aqueous alkaline stabilized or modified with Al$_2$O$_3$ colloidal silica sol. Physical properties and approximate chemical composition:

| | |
|---|---|
| Appearance | opalescent liquid |
| SiO$_2$ | 30.0% |
| Al$_2$O$_3$ | 0.2% |
| Na$_2$O | 0.13% |
| So$_4$ as Na$_2$SO$_4$ | 0.006% |
| Cl as NaCl | 0.007% |
| pH at 25°C | 8.9–9.1 |
| Viscosity at 25°C | 5–10 cps. |
| Approximate particle diameter | 15m$\mu$ |
| Approximate surface area | 210m$^2$/g SiO$_2$ |
| Freezing point | 32°F. |

"Ludox" AM, duPont (3) "Hi-Sil" 233, a precipitated, dried and flocculated hydrated silica, 87% SiO$_2$, weight loss 5% at 105°C. and 10% at ignition, 0.5% CaO, 0.6% Al$_2$O$_3$, 0.2% Max. Fe$_2$O$_3$, 1% NaCl, pH-7.0, surface area m$^2$/g-150, particle diameter m$\mu$-22, bulk density lb./cu. ft. as is -10, specific gravity-1.95, oil abs.- 135 to 165, refractive index 1.46. PPG Industries, Inc., Chemical Division, Hi-Sil Bulletin No. 20 Reissued January, 1966.
(4) Aqueous alkaline (about pH 10.5–10.7) dispersion of a rubbery terpolymer of 70 parts by weight of butadiene-1,3, 15 parts of styrene and 15 parts of 2-vinyl pyridine, 41% by weight total solids (about 39% by weight rubber solids, balance surfactant, stabilizer, etc.), Mooney viscosity ML-4 min. at 212°F. = about 40, emulsion polymerized, freeze stable.
(5) Dip pickup. Percent by weight. Pickup determined by ignition loss.
(6) Room temperature, about 22–27°C.
(7) Test used as ASTM D 2970. Undipped G-15 cords of E glass exhibit tensiles of 43–44 pounds.
(8) After 3 days at 176°F. and high humidity (H$_2$O).

RUBBER STOCKS USED IN ABOVE TESTS

| Stock A | Parts by Weight |
|---|---|
| Natural Rubber | 50 |
| Butadiene-styrene rubbery copolymer average 23.5% bound styrene, SBR-1502, emulsion polymerized | 50 |
| High abrasion furnace carbon black | 35 |
| "Endor", activated zinc salt of pentachloro - thiophenol, peptizing agent, duPont | 0.5 |
| "Circosol" 2XH, naphthenic type oil Sun Oil Company | 7.0 |
| Zinc Oxide | 3.0 |
| Stearic Acid | 1.0 |
| "Agerite Spar", a mixture of mono-, di-and tri-styrenated phenols, antioxidant, R. T. Vanderbilt Co., Inc. | 1.0 |
| "Picco 100", alkyl aromatic polyindene resin, reinforcing and processing oil, Pennsylvania Industrial Chemical Corp. | 2.0 |
| Diphenylguanidine | 0.5 |
| N-Oxydiethylene benzothiazole-2-sulfenamide | 0.9 |
| Sulfur (insoluble) | 2.60 |

| Stock B | Parts by Weight |
|---|---|
| Natural rubber | 46.64 |
| Butadiene-styrene rubbery copolymer, average 23.5% bound styrene, SBR-1500, emulsion polyermized | 38.5 |
| Polybutadiene, solution polymerized BD, about 93% cis-1,4, Raw Mooney ML-4 at 212°F. about 40–50 | 15.0 |
| Carbon black, fast extrusion furnace | 45.0 |
| Hydrated silica, "Hi-Sil" 233, PPG Industries, Inc. | 15.0 |
| "BLE" 25 antioxidant, a high temperature reaction product of diphenylamine and acetone, Naugatuck Chemical Division of Uniroyal | 2.0 |
| Processing oil, a blend of highly aromatic petroleum fractions | 5.0 |
| Zinc oxide | 3.0 |
| Stearic acid | 1.5 |
| "Cohedur" RL, a 1:1 mixture of resorcinol and "Cohedur" A (the pentamethyl ether of hexamethylol melamine) which is a colorless, viscous liquid which liberates formaldehyde on heating. Naftone, Inc.) | 4.7 |
| N-tert-butyl-2-benzothiazole-sulfenamide, "Santocure" NS, Monsanto Chemical Co. | 1.2 |
| Sulfur | 3.0 |

EXAMPLE II 11 g. of resorcinol were dissolved in 238.5 g. of $H_2O$ to which were added 0.3 g. NaOH (0.0075m.) and 16.2 g. of formalin (37% by weight of $H_2CO$ in $H_2O$). To this resin mixture there were added 244. g. of the same type of vinyl pyridine rubbery copolymer latex as used in Example I, supra, 60 g. of $H_2O$ and 11.3 g. of $NH_4OH$ (28%). The resulting cord dip had a pH of about 10.3 and total solids content of 20.2% by weight, and the rubbery copolymer content of the dip was 16.4% by weight. The dip was aged overnight. Aqueous stabilized colloidal silica sols were then added to various portions of the dip. Glass cords were then passed through the different dips and dried in an oven at 215°F. in a drying zone and then passed through a curing zone at 415° to 425°F. A control dip which did not contain any silica sol was also used as a dip on the cords. The dip pick-up on the cords was from about 16 to 18% by weight. The tensile strength of the undipped glass cords is about 43-44 pounds. The tensile strength of the cord containing the control dip was about 58-60 pounds. The change in tensile strength of cords dipped in the dips containing the colloidal silica sols, the amount of silica (dry wt.) in the dips, and the types of silica sols used are shown below:

Table III

| Percent Change of Tensile Strength (ASTM D 2970) of Glass Cords Dipped in Dips Containing Aqueous Colloidal Silica Sols as Compared to the Control Dip | | | | | | |
|---|---|---|---|---|---|---|
| Glass Cord | (9) | | | (10) | | |
| Parts by wt. of Silica (dry) per 100 parts by wt. of the rubber (dry) | 1.8 | 6.1 | 12.3 | 1.8 | 6.1 | 12.3 |
| Silica Sol A | 0 | 2.5% | 0 | 1.5% | 10.5% | 0 |
| Silica Sol B | 11% | 9% | 0 | −6% | −3% | −3% |
| Silica Sol C | 12% | 12.5% | 11% | 0 | 10% | 6% |
| Silica Sol D | 12% | 12% | 11% | 5% | 12% | 10% |
| Silica Sol E | 5% | 3.5% | −3% | 6% | 9.5% | 12.5% |
| Silica Sol F | 1% | 6% | 0 | 11% | 12.5% | 6.5% |

Notes:
(9) Owens-Corning Fiberglas Corporation ECG 75 5/0 continuous filament glass cord without twist.
(10) PPG Industries, Inc., ECG 75 5/0 continuous filament glass cord without twist.

Table IV

| Type | Properties of Aqueous Stabilized Colloidal Silica Sols | | | | | |
|---|---|---|---|---|---|---|
| | A | B | C | D | E | F |
| Stabilizing Ion | Na | Na | Na | Na | $NH_4$ | Na-Al |
| Particle Size, M$\mu$ | 13–14 | 13–14 | 7–8 | 22–25 | 13–14 | 13–14 |
| Specific Surface Area sq. in./g | 210–230 | 210–230 | 375–420 | 125–140 | 210–230 | 210–230 |
| Silica, wt. % | 40.0 | 30.0 | 30.0 | 50.0 | 30.0 | 30.0 |
| pH at 25°C. | 9.7 | 9.8 | 9.9 | 8.9 | 9.6 | 9.0 |
| Titrable Alkali wt. % $Na_2O$ | 0.43 | 0.32 | 0.6 | 0.21 | 0.25 or $NH_3$ | 0.19 |
| $SiO_2/Na_2O$ (wt.) | 93 | 93 | 50 | 230 | 120($SiO_2$/NH3) | 230 |
| Chlorides (% NaCl) | 0.01 | 0.01 | 0.01 | 0.03 | 0.002 | 0.007 |
| Sulfates (% $Na_2SO_4$) | 0.06 | 0.04 | 0.04 | 0.10 | 0.003 | 0.006 |
| Viscosity at 25°C, cp | 17.5 | 4.5 | 5.5 | 50 | 20 | 17 |
| Weight/gallon at 60°C lb. | 10.8 | 10.1 | 10.1 | 11.5 | 10.1 | 10.1 |
| duPont | Ludox HS-40 | Ludox HS-30 | Ludox SM-30 | Ludox TM-50 | Ludox AS | Ludox AM(11) |

Note:
(11) Different batch from that used in Example I above.

Appearance of the dips after silica sol additions was unchanged, and they showed no apparent storage instability.

Aging the dipped cords containing the colloidal silica for 24 hous at 175°F. in 100% humidity did not show any significant changes in the tensile strengths.

The embodiments of the invention in which an exclusive property or privilege is claimed are defined as follows:

1. A composition of matter consisting essentially of an aqueous alkaline dispersion of 100 parts by weight of a rubbery vinyl pyridine copolymer, from about 0.5 to 20 parts by weight of silica in the form of a stabilized colloidal silica sol in which the particles of silica have an average particle diameter of from about 1 to 150 millimicrons, from about 10 to 75 parts by weight of a water soluble, heat reactable resorcinol-formaldehyde resole having hydroxyl and methylol groups, from about 0 to 3 parts by weight of alkaline material selected from the group consisting of $NH_4OH$, KOH and NaOH, and from about 150 to 1100 parts by weight of water, said resole being made by reacting an excess of formaldehyde with resorcinol.

2. A composition of matter according to claim 1 where said rubbery vinyl pyridine copolymer is a copolymer of from about 60 to 80% by weight of butadiene-1,3, from about 7 to 32% by weight of styrene, and from about 5 to 22% by weight of 2-vinyl pyridine.

3. A composition of matter according to claim 2 where said silica is used in an amount of from about 1.5 to 15 parts by weight and where the particles of silica from said sol have an average particle diameter of from about 5 to 30 millimicrons.

4. A composition of matter according to claim 2 where said resorcinol-formaldehyde resole is used in an amount of from about 10 to 55 parts by weight.

5. A composition of matter according to claim 2 where said copolymer is a blend of a terpolymer of butadiene-1,3, styrene and 2-vinyl pyridine and a copolymer of butadiene-1,3 and styrene.

6. A composition of matter according to claim 4 where said copolymer is a terpolymer of about 70% by weight of butadiene-1,3, 15% of styrene and 15% of 2-vinyl pyridine.

* * * * *